United States Patent [19]

Schutijser

[11] 4,415,631

[45] Nov. 15, 1983

[54] POROUS INORGANIC SUPPORT MATERIAL COATED WITH AN ORGANIC STATIONARY PHASE, FOR USE IN CHROMATOGRAPHY, AND PROCESS FOR ITS PREPARATION

[75] Inventor: Jan A. J. Schutijser, Dieren, Netherlands

[73] Assignee: Akzo, Arnhem, Netherlands

[21] Appl. No.: 278,864

[22] Filed: Jun. 29, 1981

[30] Foreign Application Priority Data

Jun. 27, 1980 [NL] Netherlands .......................... 8003727

[51] Int. Cl.$^3$ .......................... B32B 5/16; B32B 9/00; B01J 3/02
[52] U.S. Cl. ..................................... 428/405; 428/404; 428/447; 502/150; 210/198.2; 210/656; 427/219; 528/26
[58] Field of Search ............... 428/405, 406, 407, 447; 252/430, 428; 210/656, 635, 198.2; 427/219, 220; 528/26; 521/25

[56] References Cited

U.S. PATENT DOCUMENTS 3,983,299 9/1976 Regnier ................................. 428/405
3,984,349 10/1976 Meiller et al. ....................... 252/428

*Primary Examiner*—George F. Lesmes
*Assistant Examiner*—B. K. Johnson
*Attorney, Agent, or Firm*—Abelman, Frayne & Rezac

[57] ABSTRACT

The invention relates to support material usable as such in chromatography or as a starting material which, upon linkage to it of compounds containing ionic groups, ligands or biomacromolecules, can be used as ion exchanger, as a medium in affinity chromatography or in enzymatic reactions and consists of porous, inorganic silanized particles onto which there is covalently bonded an organic, stationary phase built up of (co)-polymerized vinyl monomers containing amide groups, said inorganic particles having been silanized with an organo silane.

17 Claims, No Drawings

POROUS INORGANIC SUPPORT MATERIAL COATED WITH AN ORGANIC STATIONARY PHASE, FOR USE IN CHROMATOGRAPHY, AND PROCESS FOR ITS PREPARATION

The invention relates to support material usable as such in chromatography or as a starting material which, upon linkage to it of compounds containing ionic groups, ligands or biomacromolecules, can be used as ion exchanger, as a medium in affinity chromatography or in enzymatic reactions and consists of porous, inorganic silanized particles onto which there is covalently bonded an organic, stationary phase built up of (co)-polymerized vinyl monomers containing amide groups.

Support material of the type indicated above is described, int. al., in U.S. Pat. No. 3,983,299. The organic, stationary phase then used is a thin layer of a carbohydrate such as dextran or saccharides having a molecular weight <6000. A great disadvantage to this type of support material is that carbohydrate is a natural material which is not only subject to oxidative degradation, but also to biological attack. A further disadvantage is that the number of functional groups to be finally bonded to it remains rather limited.

The present invention provides a novel type of support material which does not display the above-mentioned disadvantage.

It is to be noted that support material for use in chromatography, more particularly, affinity chromatography, and based on a porous, inorganic material and an organic, stationary phase of a synthetic polymer is known from German Patent Specification 2 750 595. In that case, however, no use is made of silanized material and a less strong bond is obtained between the organic stationary phase and the inorganic material. Moreover, no mention is made in said German Patent Specification of the use of a cross-linked polymer. Partly because of the use of a non-silanized material and particular vinyl monomers it may under some circumstances happen that neither the hydrolytic stability nor the adsorption behaviour of this support material are satisfactory.

The present invention provides a hydrolytically very stable support material which is excellently suitable to be employed for the above-mentioned purpose where the support material is to be used many times in succession.

The new support material according to the invention consists of porous, inorganic silanized particles onto which there is covalently bonded an organic, stationary phase built up of (co)polymerized vinyl monomers and containing amide group, and is characterized therein that:

(A) the inorganic material has been silanized with an organic silane of the formula I

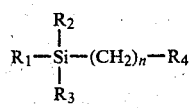

wherein
n=1–5, preferably 3; $R_1$ is halogen or alkoxy (1–10 C); $R_2$ and $R_3$ are each halogen, alkoxy (1–10 C), alkyl (1–3 C) or aryl (6–10 C), the halogen and alkoxy group in $R_1$, $R_2$ and $R_3$ being capable of forming an —O—Si— —bond between the silane and the inorganic material through its surface hydroxyl groups; and $R_4$ is amino, substituted amino, such as ω-aminoalkyl (1–3 C)-amino, mercapto, an ester group or glycidoxy and is preferably glycidoxy; and (B) the organic stationary phase is a cross-linked (co)polymer obtained by addition polymerization and built up of 0.1 to 140 μmoles, preferably of 5 to 25 μmoles, vinyl monomers per m² inorganic surface of the support material, said (co)polymer containing at least 0.1 μmoles amide groups per m² inorganic surface of the support material, said vinyl monomers consisting wholly or partly of bifunctional vinyl monomers containing amide groups and having the formula II

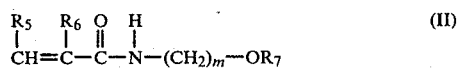

wherein
$R_5$ and $R_6$ each are hydrogen or an organic group having up to 18 carbon atoms; $R_7$ is hydrogen or an organic group up to 20 carbon atoms; and m is an integer from 1 to 20.

The new support material can advantageously be used on an industrial scale. It has very adequate hydrophilic characteristics, has high mechanical stability and is capable of withstanding high flow rates. It does not dissolve in aqueous solutions and does not give rise to nonspecific interactions with biomacromolecules. The material can easily be regenerated and is resistant to degradation by microbes and enzymes.

With the term "bifunctional vinyl monomer" as used in the present specification and claims is meant a monomer having beside its vinylic function at least one hydrophilic functional group capable of forming covalent bonds, i.e. in formula II the group —$OR_7$. "Partly" is preferably >5 mol. %. Silanized inorganic material comprising glycidoxy groups is hydrolyzed so as to obtain glyceryl groups prior to (co)polymerization.

Great Britain patent No. 1 456 865 discloses a siliceous particulate support material for use in chromatography, especially in ion-exchange chromatography, with a stationary organic phase being a copolymer bonded to the surface of the support material. The siliceous material is silanized with a vinyl silane and the silanized material is copolymerized with a vinylic monomer containing one or more olefinic groups. The vinylic monomer may contain functional groups, such as halogen, hydroxyl, methoxy, amide, trichlorosilanyl, carboxylic acid and an ester group, but these functional groups do not seem to be essential in view of the Examples which relate to vinylic monomers such as propylene, isobutylene, styrene and butadiene, the exception being Example 4, wherein the vinyl monomer is maleic anhydride. The bonded graft copolymer which depending on the choice of the vinylic monomer is not crosslinked or slightly crosslinked, may be further crosslinked using crosslinking agents such as divinylbenzene or dichloropropane. The product produced, having predominantly hydrophobic characteristics, is then preferably converted into an acid or a base ion-exchange graft copolymer by sulphonation, phosphonation, carboxylation, hydroxylation or ammination.

Alternatively, the bonded copolymer may be functionalized by reacting with a chelating agent to introduce a chelating agent into the bonded graft copolymer or nitrile groups may be introduced by reacting an alkyl nitrile with halogen atoms contained in the bonded copolymer.

This known vinyl-silanized support material with copolymer covalently bonded onto it, has not the particular hydrophylic characteristics and not the great versatility in chromatographic applications of the material according to the invention. The known material is not suitable for affinity chromatography and has poor properties in size exclusion chromatography.

U.S. Pat. No. 3,984,349 discloses a porous, divided or colloidal inorganic support material for use in chromatography containing surface hydroxyl groups which are modified by grafting to the surface an organic group to establish an —O—Si bond, wherein the organic group has an average molecular weight greater than 150 and contains at least one hydrophilic functional group. The organic group is a silane produced by the addition of a compound comprising a vinyl or allyl termination and at least one hydrophilic radical and a simple silane, or by copolymerisation of a vinyl monomer containing at least one hydrophilic radical and an unsaturated silane, i.e. an organo silane in which the organic group contains ethylenic unsaturation. The silane thus produced is reacted with the inorganic support material, e.g. silica. In this case the surface of the support material is provided with long chains ("tails") of (co)polymer without any crosslinking or in the case of a copolymer containing several silane groups per molecule, not all these silane groups will react with the surface hydroxyl groups of the inorganic support material, so that for this known material the disturbing non-specific adsorption properties of the support material itself or of the silanol groups of the silanes are still present to a certain extent. For various chromatographic applications (e.g. size exclusion chromatography, affinity chromatography) this adsorption phenomenon is very disturbing. Coating the inorganic support material according to the present invention leads to chromatographic support material with completely or almost completely deactivated inorganic surface and having excellent hydrophilic properties. Various porous, inorganic materials are suitable for use in the support according to the invention. Examples thereof include oxides of aluminium, titanium, nickel, zirconium and iron, various silicates such as clay, diatomaceous earth, kaolin, bentonite, magnesium silicate (talc), asbestos and glass. Preference is given to porous silica ($SiO_2$). Particularly favourable results are obtained with silica beads. Suitable beads are marketed by Rhone-Poulenc under the trade name Spherosil. Over controlled pore glass this material has the advantage that it is virtually spherical. Moreover, the price of it is considerably lower.

The pore diameter of the inorganic materials will generally range from 50 to 10,000 Å. The diameter to be chosen depends on the use envisaged. In affinity chromatography, for instance, use will generally be made of beads having a pore diameter in the range of 250 to 3000 Å.

The pore volume of the beads will generally be in the range of 0.01 to 3 ml/g, preference being given to a volume of about 1 ml/g. The specific surface area of the beads will generally be in the range of 0.5 to 1000 $m^2/g$, the most current value being in the range of 5 to 500 $m^2/g$.

In the preparation of support material for affinity chromatography preference is given to the use of beads having a specific surface area in the range of 25 to 100 $m^2/g$, which corresponds to beads having a pore diameter in the range of 1000 to 250 Å, respectively. Depending on the use envisaged for the support material, the average diameter of the inorganic material to be employed for the preparation thereof will generally range from 2 to 3000$\mu$.

In the preparation of support material for affinity chromatography use may be made of beads having an average diameter in the range of 50$\mu$ to 3000$\mu$, preference being given to beads having an average diameter in the range of 100 to 800$\mu$. In the preparation of support material for high pressure liquid chromatography (HPLC) the use is preferred of beads having an average particle size in the range of 2 to 50$\mu$.

Before an organic stationary phase is covalently bonded onto it, the porous, inorganic material must be silanized. This may be done in a manner which is known in itself in chemical technology. The object of silanization is to provide the inorganic material with reactive groups in order to permit bringing about a covalent linkage to the crosslinked polymer. Examples of silanization reactions that are suitable for use in the preparation of the present support materials are described in the afore-mentioned U.S. Pat. No. 3,983,299 and in an article by Pryde in Journal of Chromatographic Science, Vol. 12, (1974), pp. 486–498. As indicated hereinbefore the inorganic material is silanized with an organo silane of the formula I. Within the scope of the invention preference is given to support material of which the inorganic material is subjected to silanization with $\gamma$-aminopropyl siloxy groups, $\gamma$-mercaptopropyl siloxy groups or hydrolysed $\gamma$-glycidoxypropyl siloxy groups, the last-mentioned group being mostly preferred.

It has been found that for most of the afore-mentioned uses the most favourable results are obtained with a support material in which the crosslinked polymer is built up of 5 to 25 $\mu$moles of vinyl monomers per $m^2$ of inorganic surface area of the silanized material. Particularly in the case where the present support materials are employed for affinity chromatography, it is desirable that they have optimal hydrophilic characteristics. This requirement is satisfied by the present invention providing a support material containing at least 0.1 $\mu$mole of amide groups per $m^2$ inorganic surface area of the silanized material. Amide groups are not only resistant to hydrolytic decomposition in aqueous solutions under widely varying conditions, but they are also stable to microbal and/or enzymatic attack. In actual practice, the support material will contain 5 to 25 $\mu$moles of amide groups per $m^2$ inorganic surface area of the silanized material.

As indicated hereinbefore the introduction of amide groups into the organic, stationary phase is effected by using in the (co)polymerization a bifunctional vinyl monomer of the formula II. Said bifunctional vinyl monomer may be the sole source for the amide groups. However, it is also possible within the scope of the invention to obtain advantageously the amide groups partly by bringing a compound containing a spacer molecule, a ligand, a bio-macromolecule or an ionic group having a reactive group and one or more amide groups into reaction with a reactive group of the vinyl monomer or the crosslinked polymer. The properties of the support material may also be favourably influenced if the amide groups are partly obtained by bringing one or more amino and/or carboxyl groups in the crosslinked polymer into reaction with a compound containing a spacer molecule, a ligand, a biomacromolecule or an ionic group having carboxyl groups and/or amino groups.

Within the scope of the invention it has been found that coated materials in which the amide groups-containing vinyl monomers of the formula II are incorporated are excellently suitable for use in liquid phase exclusion chromatography, gel filtration or size exclusion chromatography (SEC). The porous, inorganic material advantageously consists of silica beads preferably having a diameter in the range of 100 to 200μ and marketed by Rhone-Poulenc under the trade name Spherosil. To the coated beads there is the great advantage that in the usual aqueous solutions no adsorption or biospecific interaction takes place between the surface of the beads and the biomacromolecules.

Amide groups containing vinyl monomers particularly suitable to be used in the preparation of a polymer coating are N-(hydroxyethyl)acrylamide and N-methylol(meth)acrylamide, preferably the latter.

By the use of the bifunctional vinyl monomer of formula II crosslinking is effected during addition polymerization. In the case of γ-amino propylsiloxy groups being present on the silanized material the covalent bond will generally be an amide bond obtained by reacting an amino group of the silane with a carboxyl group of the addition polymer. In the case of N-methylolamide groups being contained in one or more vinyl monomers of the addition polymer preference is given to applying γ-glycerylpropyl siloxy groups to the inorganic material. The N-methylolamide groups are capable, with heating and optionally in the presence of a trace of acid, of reacting with themselves or with the glyceryl group of a γ-glyceryl propyl siloxy compound, as a result of which the addition polymer is crosslinked as well as covalently bonded to the silanized material.

Not only the choice of the silane for obtaining the silanized inorganic material and the bifunctional vinyl monomer used in the (co)polymerization, also the process for preparing the support material according to the invention contributes to obtaining optimal products. The silanized, inorganic material is obtained according to methods known in the art as indicated hereinbefore. The crosslinked polymer coating is obtained by the following procedure. First the monomers and, as the case may be, di- and/or oligomers are dissolved in a volatile, organic solvent or organic solvents and/or water and added to the silanized, inorganic material. Preferably in a rotary vacuum evaporator the volatile solvent is subsequently removed, with stirring, under reduced pressure and low temperature (<40° C.). Upon adding a solvent for the radical initiator, in which solvent the monomers do not or hardly dissolve, the mixture is heated in an oxygen-free atmosphere, as a result of which the monomers are polymerized and a covalent linkage to the silanized material is brought about. Optionally, the radical initiator may already be added to the solution of the monomers.

Beside the bifunctional vinyl monomer of formula II other vinyl monomers may be used in the copolymerization to obtain the crosslinked polymer. Depending on the field of application envisaged the additional vinyl monomers may be of the most widely varying structure.

Conceivable examples thereof include the epoxy compounds having an ethylenically unsaturated group mentioned in the above German Patent Specification 2 750 595. Also vinyl monomers having no reactive group, such as ethylene, propylene, vinyl chloride, vinyl fluoride and/or vinyl acetate may be used, though their use is limited within the scope of the present invention. A prerequisite is, however, that the monomers can be readily polymerized into an addition polymer having the properties required for the use envisaged. For instance, if the material is to be used as ion exchanger, copolymerization may be considered in which use is made of a vinyl monomer having a cationic or anionic group. Examples of compounds containing an anionic group are vinyl monomers having a carboxyl group or sulphonic acid group, such as ethylene sulphonic acid, allyl sulphonic acid, styrene sulphonic acid, 2-sulphoethyl methacrylate, 2-acrylamido-2-methylpropyl sulphonic acid, 3-methacryloyloxy-2-hydroxy-propyl sulphonic acid, the (meth)acryloyl ester of ω-hydroxyalkylene sulphonic acid having 1 to 20 carbon atoms in the alkylene group, N-acryloyl taurine, vinyloxybenzene sulphonic acid and acrylic or methacrylic acid.

Examples of vinyl monomers having a cationic group are:

alkenyl pyridines of the formula:

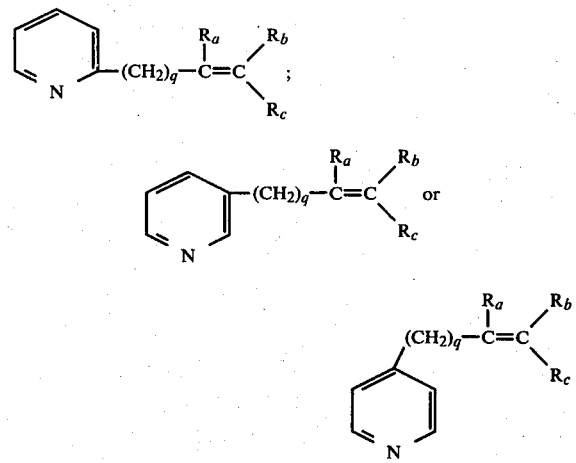

wherein
q=0 or an integer from 1 to 20 and $R_a$, $R_b$ and $R_c$ may be the same or different and represent a hydrogen atom or an alkyl group having 1 to 20 carbon atoms;

amino alkyl acrylates and methacrylates such as t-butylamino ethyl methacrylate, diethylamino ethyl acrylate, dimethylamino propyl methacrylamide and methacrylamido propyl trimethyl ammonium chloride.

For use as starting material for affinity chromatography preference is given to vinyl monomers having reactive groups that can be readily coupled to compounds which on the one hand have a reactive group and on the other a ligand suitable for use in a particular field of affinity chromatography. To affinity chromatography the same meaning is attributed here as done by Turková in "Affinity Chromatography", Elsevier, 1978, pp. 1 and 2. So not only affinity methods in the sense of biospecific adsorption are covered by it, but also hydrophobic chromatography, covalent chromatography, affinity elution as well as the study of interactions on support materials to which oligonucleotides are bonded. By affinity chromatography is also to be understood the isolation of biomacromolecules by simple sorption on a specific sorbent. It is also possible, of course, to use vinyl monomers in which the functional group is bonded without the intermediary of two reactive groups.

In addition to the afore-mentioned vinyl monomers having an anionic or cationic group examples of vinyl monomers having reactive groups include: halogenated monomers, such as halogenated alkyl acrylates or methacrylates. As examples thereof may be mentioned: 2-chloroethyl acrylate and 2-chloroethyl methacrylate; halogenated alkyl acrylic acid and compounds derived thereof having the formula:

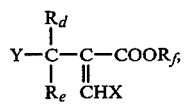

wherein $R_d$ and $R_e$ may be the same or different and represent a hydrogen atom, a methyl group or an ethyl group and $R_f$ represents a hydrogen atom, a lower alkyl group or an aryl group, X stands for a hydrogen atom, halogen, CN, an aryl group, OH, COOH or O-aryl and Y represents a chlorine or bromine atom; and halomethylated styrene such as p-chloromethyl styrene.

Further examples include: reactive heterocyclic vinyl monomers such as 2-(1-aziridinyl)ethyl methacrylate, allyl glycidyl ether, glycidyl methacrylate, thioglycidyl acrylate, N-vinyl-2-pyrrolidone and maleic anhydride; vinyl monomers having an aldehyde end group, such as acrolein and crotonaldehyde; vinyl monomers having an amino group, such as allyl amine, vinyl amine and p-amino styrene; acid monomers such as maleic acid, fumaric acid, itaconic acid and acids of the formula:

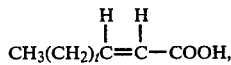

wherein t=0 or an integer from 1 to 20; acrylic acid and compounds derived therefrom, such as $Cl_2C=CH$ COOH; vinyl alkylene carboxylic acid having 2 to 20 carbon atoms in the alkylene group; p-vinyl benzoic acid; alkyl vinyl ether having 1 to 18 carbon atoms in the alkyl group; vinyl phenyl ether; hydroxyalkylene vinyl ether having 2 to 20 carbon atoms in the alkylene group; the vinyl ether of a polyalkylene oxide glycol having 2 to 20 alkylene oxide units and 2 to 5 carbon atoms per alkylene oxide unit; compounds of the formula:

wherein $R_g$ has the meaning of a hydrogen atom or an alkyl group having 1 to 18 carbon atoms, and A represents a hydrogen atom or an alkyl group having 1 to 20 carbon atoms and v represents an integer from 1 to 20.

Particularly suitable are compounds having the formula

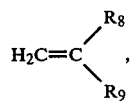

wherein $R_8$ has the meaning of a hydrogen atom or methyl; $R_9$ is $-CH_2NH_2$,

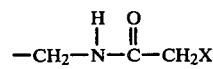

or $CH_2OR_{10}$;

X is halogen, preferably Br; and $R_{10}$ is alkyl up to 10 carbon atoms, preferably methyl, or glycidoxy.

As starting material which is made suitable for use in affinity chromatography upon linkage thereto of ligands, however, there is preferably employed a crosslinked (co)polymer of one or more vinyl monomers having a functional group of the formula:

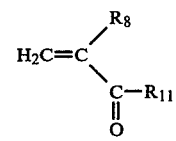

wherein $R_8$=H or $CH_3$ and $R_{11}$ represents a functional group which may be linked or not via a spacer group, and wherein $R_{11}$ has the meaning of a hydroxyl group or one or more of the following groups:

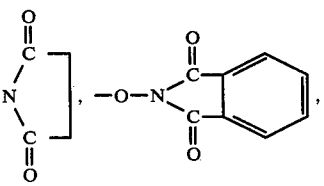

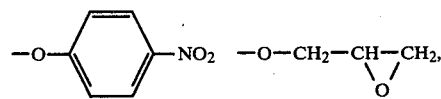

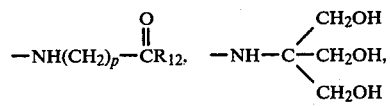

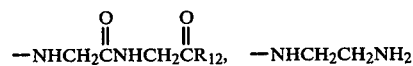

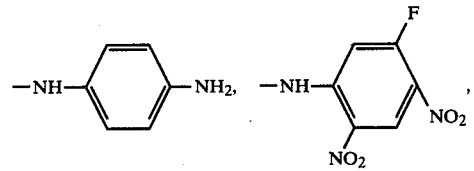

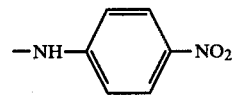

wherein $R_{12}$ may have the same meaning as $R_{11}$ and p represents an integer from 2 to 10.

According to the invention it is of advantage if the molecular weight of the vinyl monomer having a functional group and possibly also a spacer group is not more than 1000 and preferably in the range of 70 to 400.

Examples of ligands suitable for use in affinity chromatography include amino acids, mononucleotides, oligonucleotides and polynucleotides, various organic colourants, enzyme inhibitors, polyamino acids, lectins, polysaccharides, lipids, antigens, enzymes.

The invention will be further described in the following examples. It will be clear that these examples merely serve to illustrate the present invention and that they constitute no limitation on the scope thereof.

EXAMPLE I

Preparation of γ-glycerylpropyl siloxy silica beads. 110 g of silica beads (average pore diameter 600 Å; specific surface area 50 m$^2$/g; diameter range: 100 to 200 μ) were treated for 2 hours with 400 ml of distilled water in an ultrasonic bath at 80° C. After the beads had been washed with water until a clear solution was obtained, they were activated by treating the suspension with 40 ml of 4N HNO$_3$. After washing with water and drying 460 ml of toluene were added to 100 g of silica beads contained in a flask. Subsequently, 40 ml of γ-glycidoxypropyl trimethoxysilane were introduced into the flask. After the flask had been attached to a rotary vacuum evaporator, it was heated for 5 hours on an oil bath of 90° C.

Following cooling the suspension was filtered off and washed with 500 ml of toluene and 1 liter of acetone. After the acetone had been removed under reduced pressure, the beads were dried for 2 hours at 50° C. and under reduced pressure. After the drying overnight at 120° C. and under reduced pressure of about 200 mg of beads the carbon content was determined by elemental analysis. It was found to be about 2%, which corresponds to about 280 μmoles of γ-glycidoxypropyl siloxy groups per gramme of beads. In a totary vacuum evaporator containing 300 ml of water acidified to pH=2 with 10% HCl 105 g of these beads were degassed at a pressure of 12 mm Hg.

Subsequently, the material was stirred for 1 hour at a pressure of 1 atmosphere on an oil bath of 90° C. After the material had been cooled, the beads were filtered and washed with water until neutral. Next, the beads were dried for 3 hours at 70° C. and left overnight under reduced pressure at 120° C. By elemental analysis it was found that the amount of γ-glycerylpropyl siloxy groups was about 280 μmoles per gramme of beads.

EXAMPLE II

Use being made of the same procedure as described in Example I, silica beads (pore diameter: 260 Å, particle size: 100–200μ, specific surface area: 108 m$^2$/g) were treated with γ-glycidoxypropyl trimethoxysilane containing up to 500 μmoles of γ-glycidoxypropyl siloxy groups per gramme of silica. After hydrolysis with formation of γ-glycerylpropyl siloxy silica 25 g of these beads were suspended in 100 ml of dioxane. To this suspension there were added 7.5 ml of a 60% by weight aqueous solution of N-methylol acrylamide. In a rotary vacuum evaporator the dioxane was evaporated off until the beads were rolling in the flask. Subsequently, there was added a solution of 150 mg of dibenzoyl peroxide (20% water) in 100 ml of n-hexane. After the suspension had been subjected to a nitrogen atmosphere, the mixture was polymerized for 1½ hours at 70° C. The suspension was transferred to a glass filter and washed with acetone and methanol, after which the beads were dried under reduced pressure at 120° C. By elemental analysis it was found that the carbon content was 8.73% and the nitrogen content 1.78%. Per gramme of support material 1270 μmoles of N-methylol acrylamide were present in a matrix in the form of the polymer. This corresponds to 14.8 μmoles of N-methylol acrylamides per m$^2$.

EXAMPLE III

Use being made of the same procedure as described in Example I, silica beads were loaded with 300 μmoles of γ-glycerylpropyl siloxy groups per gramme of beads (pore diameter: 500 Å, bead diameter: 100–200 μ, specific surface area: 63 m$^2$/g). 100 g of these beads were mixed with 7.5 ml of an aqueous solution containing 60% by weight of N-methylol acrylamide. Into 400 ml of anhydrous ethyl acetate there were successively introduced: 2.882 g (40 mmoles) of acrylic acid: 5.524 g of N-hydroxysuccinimide (48 mmoles) and 9.078 g (44 moles) of N,N'-dicyclohexyl carbodiimide, followed by filtering the solution after 1 night's stirring. The filtrate was added to the suspension of silica beads, after which the ethyl acetate was removed under reduced pressure at 40° C. in a rotary vacuum evaporator. To the beads there was subsequently added a solution of 400 mg of dibenzoyl peroxide in 400 ml of isooctane. The suspension was heated in a nitrogen atmosphere for 1½ hours at 70° C., causing the film on the beads to polymerize. After filtration the beads were washed with acetone and methanol and subsequently dried in vacuo at 120° C. By elemental analysis it was found that the following results had been obtained:

C 6.54%
N 0.99%.

By microtitration (adding exess ethanolamine and back-titrating with HCl) the amount of carboxyl groups activated with N-hydroxysuccinimide was found to be 241 μmoles per gramme or 4.4 μmoles per m$^2$. The amount of N-methylol acrylamide was found to be 460 μmoles per g.

EXAMPLE IV

Use being made of the same procedure as described in Example III, silica beads were loaded with 257 μmoles of γ-glycerylpropyl siloxy groups per gramme of beads (pore diameter: 500 Å, bead diameter: 100–200 μ, specific surface area: 63 m$^2$/g).

100 g of these beads were mixed with 6.0 ml of an aqueous solution containing 60% by weight of N-methylol acrylamide (40 mmoles).

To 400 ml of anhydrous dioxane there were successively added 7.4 g of 6-acrylamidopentane carboxylic acid (40 mmoles prepared in accordance with an article by E. Brown et al., in J. of Chromatography 150 (1978) pp. 101–110), 5.524 g of N-hydroxysuccinimide (48 mmoles) and 9.078 g (44 moles) of N,N'-dicyclohexyl carbodiimide, followed by filtering the solution after 1 night's stirring. The ethyl acetate was completely removed by evaporation, with stirring, under reduced pressure at 40° C. To the beads there was subsequently added a solution of 400 mg of dibenzoyl peroxide in 400 ml of n-hexane. The suspension was heated in a nitrogen atmosphere for 1½ hours at 70° C., causing the film on the beads to polymerize. After filtration the beads were washed with acetone and methanol and subsequently dried in vacuo at 120° C. Elemental analysis of the support material showed the following results:

C 6.49%
N 1.05%.

By microtitration the amount of carboxyl groups activated with N-hydroxysuccinimide was found to be 200 μmoles per gramme or 3.7 μmoles per m$^2$. The amount of N-methylol acrylamide built in was found to be 360 μmoles per g.

EXAMPLE V

Use being made of the same procedure as described in Example I, alumina beads (Alumina Woelm $N_{18}$, high resolution, high speed, fine mesh aluminiumoxide, W200 neutral, specific surface area: 200 m²/g, particle size 18-30 μ) were loaded with 422 μmoles γ-glycerylpropyl siloxy groups per gramme of beads.

10 g of the silanized beads were suspended in 50 ml of ethylacetate. To this suspension there were added 3.80 ml of an aqueous solution containing 60% by weight of N-methylol acrylamide. After evaporation of ethylacetate a solution of 150 mg dibenzoylperoxide (20% water) in 60 ml of isooctene was added. After the suspension has been subjected to a nitrogen atmosphere, the mixture was polymerized for 1.5 hours at 70° C.

After washing and drying the elemental analysis of the product gave a carbon content of 7.89% and a nitrogen content of 1.58%. Per gramme of support material 1130 μmoles N-methylolacrylamide were present in the form of the polymer. This corresponds to 6.78 μmoles N-methylolacrylamide per m².

EXAMPLE VI

Use being made of the same procedure as described in Examples I and II silica beads (pore diameter 700 Å, bead diameter: 100–200 μ, specific surface area: 42 m²/g) were silanized and coated with γ-glycerylpropylsiloxy and polymerized N-methylolacrylamide. Elemental analysis revealed that the carbon content of the product was 3.15% and the nitrogen content 0.57%. The amount of amide groups was 10.3 μmol/m².

EXAMPLE VII

Use being made of the same procedure as described in Example I, silica beads were loaded with 250 μmoles of γ-glycerylpropyl siloxy groups per gramme of beads (pore diameter: 700 Å, bead diameter: 100–200 μ, specific surface area: 42 m²/g).

5 g of these beads were mixed with 20 ml of dioxane, followed by adding to the resulting suspension 0.375 ml (2.5 mmoles) of a 60% by weight aqueous solution of N-methylol acrylamide, 0.360 g (2.53 mmoles) of glycidyl methacrylate and 10 mg of azobisisobutyronitrile (AIBN). The dioxane was removed under reduced pressure at 40° C. in a rotary vacuum evaporator. Subsequently, the beads were heated for 4 hours in a flask on an oil bath of 80° C., after which the beads were dried in vacuo for 2 hours at 100° C. After the beads had been allowed to cool, they were thoroughly washed with acetone and dried again. By elemental analysis it was found that the carbon content was 5.91% and the nitrogen content 0.51%. By microtitration it was determined that the amount of epoxy groups was 105 μmoles per gramme or 2,9 μmoles/m². From the N-content found it can be calculated that into the polymer coating there were incorporated about 310 μmoles of N-methylol acrylamide/g.

EXAMPLE VIII

Use being made of the same procedure as employed in Example I, silica beads were loaded with 390 μmoles of γ-glycerylpropyl siloxy groups per gramme of beads (pore diameter 650 Å, bead diameter: 100–200 μ, specific surface area: 50 m²/g).

10 g of these beads were suspended in 30 ml of dioxane, followed by adding to the resulting suspension 0.75 ml (5.00 mmoles) of a 60% by weight aqueous solution of N-methylol acrylamide. After the solvent had been evaporated, there were added 50 ml of n-hexane in which 25 mg of dibenzoyl peroxide (20% water) had been dissolved. After polymerization the beads were washed with acetone and methanol and subsequently dried. By elemental analysis a carbon content of 4.45% and a nitrogen content of 0.54% were found. This support material was subsequently coated with a second layer of polymer.

To that end 0.370 g of 6-acrylamidopentane carboxylic acid, 0.276 g of N-hydroxysuccinimide and 0.454 g of N,N'-dicyclohexyl carbodiimide were brought into reaction with each other in 20 ml of dioxane. After filtration of the reaction mixture the solution was mixed with 20 ml of dioxane, 0.150 ml of a 60% by weight aqueous solution of N-methylol acrylamide and 10 grammes of the silica material provided with a first coating of polymer.

After evaporation of the dioxane 60 ml of n-hexane containing 30 mg of dissolved dibenzoyl peroxide were added. By elemental analysis the carbon content was found to be 6.48% and the nitrogen content 0.96%. By microtitration the amount of carboxyl groups activated with N-hydroxysuccinimide was found to be 100 μmoles per gramme or 2.33 μmoles per m².

EXAMPLE IX 10 g of the beads coated in accordance with the procedure of Example IV were treated with a solution of 4.5 g of heparin (175 USP Units/mg) in 60 ml of an 0.1 M(olar) borate buffer of pH=7.7.

After the suspension had been degassed, it was kept at pH=8 by adding 1 M sodium hydroxide solution and stirred for 22 hours. Next, the suspension was filtered and washed successively with 400 ml of water, 600 ml of 3 M NaCl and 400 ml of water. After the excess of carboxyl groups activated with N-hydroxysuccinimide had been blocked by titration with 1 M ethanolamine, the beads were washed with 400 ml of water, 300 ml of 3 M NaCl and 500 ml of 0.01 M trisbuffer (pH=7.4).

Of the 112.5 μmoles of amino groups of the heparin 86.5 μmoles were after reaction found back in the solution and the washing agents by fluorescence spectroscopy. The support material thus loaded with heparin was packed into a 50×16 mm column having a bed volume of 10 ml. The column was first treated with 0.01 M tris buffer (pH=7.4). Next, 60 ml of bovine plasma were passed through the column at a flow rate of 22 ml per hour. The plasma showed an antithrombin-III activity of 0.92 E/ml. After washing with 0.01 M tris buffer the adsorbed activity was eluted with 0.01 M tris buffer and 3 M NaCl. The overall recovery yield was 75%. The purity was 2.2 E per mg of protein, which means a purification factor of 167.

EXAMPLE X 5 g of the beads coated in accordance with the procedure of Example VIII were treated with a cooled solution of bovine antithrombin-III and 140 mg of heparin (having a minimal amount of free amino groups) in 20 ml of an 0.1 M(olar) phosphate solution (pH=7.4). The solution contained 11 mg of antithrombin-III/ml having an activity of 5.7 E/mg.

After the beads had been degassed, the solution was stirred for 24 hours at 4° C. on a rotary vacuum evaporator. Next, the beads were washed on a glass filter with 200 ml of 0.1 M phosphate buffer (pH=7). The remaining activated carboxyl groups were blocked by titration with 1 M ethanolamine, after which the beads were washed successively with a 3 M NaCl-containing 0.1 M phosphate buffer (pH=7.4) and an 0.15 M NaCl-containing 0.1 M phosphate buffer (pH=7.4). The amount of adsorbed antithrombin-III/g support material was determined by the Folin test method and was found to be 8 mg per g of support material. This material was packed into a column, after which the heparin adsorption capacity was determined. To this end, after equilibration with an 0.15 M NaCl-containing 0.02 M phosphate buffer (pH=7.4) a large excess of heparin was passed through the column. Next, the adsorbed heparin was eluted with a 3 M NaCl-containing 0.02 M phosphate buffer (pH=7.4). It was found that the column had adsorbed 140 μg of heparin per ml of bed volume.

EXAMPLE XI

Use being made of the same procedure as given in Example III, silica beads were loaded with 300 μmoles of γ-glyceryl-propyl siloxy groups per gramme of beads (pore diameter: 500 Å, bead diameter: 100–200 μ, specific surface area: 63 m$^2$/g).

The surface was coated in the manner indicated in Example III with 407 μmoles of N-methylol acrylamide and 104 μmoles of carboxyl groups/g activated with N-hydroxysuccinimide. Of the material thus activated 10 g batches were reacted with each of the following primary amines:

(1) p-aminobenzamidine-hydrochloride
(2) ethanolamine
(3) N,N-diethylethylene diamine
(4) taurine
(5) hexylamine
(6) ethylene diamine and, next, succinic anhydride.

1. 10 g of the support material were suspended in a solution of 2.4 g (11.5 mmoles) of p-amino benzamidine dihydrocholoride in 40 ml of 0.1 M phosphate buffer (pH=8). After the suspension had been degassed, it was brought to pH=8 with 2 N sodium hydroxide solution and stirred for 16 hours.

Subsequently, the suspension was filtered and alternately washed with 0.1 M acetate buffer containing 1 M NaCl (pH=4) and 0.1 M phosphate containing 1 M NaCl (pH=8) and finally with water.

By microtitration (adding excess ethanolamine and back-tritrating with NCl) it was established that the support material treated no longer contained any activated carboxyl groups. The nitrogen content of the endproduct was 0.76% from which it can be calculated that 45 μmoles/g support material were incorporated. This support material is very suitable to be used in isolating proteases such as trypsin in accordance with a method described by Hixson et al. in Arch. Biochem. Biophys. 154 (1973) 501 and Methods Enzymol. 34 (1974) 440.

2. 10 g of the support material were suspended in 30 ml of an 0.01 M ethanolamine solution. The suspension was successively degassed, stirred for 30 minutes, filtered, washed with water, 1 M NaCl and again with water.The nitrogen content measured was 0.71%, which amounts to a virtually quantitative conversion of the activated carboxyl groups.

3. 10 g of the support material were suspended in a solution of 0.32 ml (2.2 mmoles) of N,N-diethylethylene diamine in 25 ml of dimethyl formamide. After the solution had been degassed, it was stirred for 16 hours. Next, the suspension was filtered and successively washed with 200 ml of dimethyl formamide, 200 ml of water, 300 ml of 1 M NaCl and 300 ml of water. By elemental analysis the nitrogen content was found to be 0.85%. The number of tertiary amino groups/g product was determined by titration in acetic acid with perchloric acid and was found to be 100 μmoles/g.

4. 10 g of the support material were suspended in a solution of 2.5 g (20 mmoles) of taurine in 25 ml of water and 3.1 ml (21 mmoles) of triethylamine. Following degassing the suspension was stirred for 24 hours. After filtration the suspension was washed successively with water, 2 M NaCl, 5% hydrochloric acid and water. By elemental analysis the sulphur content was found to be 0.30% by weight, which corresponds to an incorporation of 93 μmoles of sulfoethyl groups per gramme. The support material was suitable for use as a strongly acid ion exchanger.

5. 10 g of the support material were suspended in a solution of 0.222 g (2.2 mmoles) of hexylamine in 25 ml of dimethyl formamide. After the solution had been degassed, it was stirred for 16 hours. Following filtration the support material was washed successively with 200 ml of dimethyl formamide, 200 ml of water, 300 ml of 1 M NaCl and 300 ml of water. By elemental analysis the nitrogen content was found to be 0.70%, which amounts to a virtually quantitative conversion. The support material thus prepared was suitable for use in hydrophobic (affinity) chromatography as shown by the following experiment:

A solution of 5 mg of microbial lipase (originating from Chromobacterium Viscosum) in 10 ml 0.05 M Tris, 0.05 M maleic acid anhydride buffer containing 1 M NaCl (pH 7.0) was contacted with 0.5 g of the support material. The activity, determined according to a method described by A. Louwers and R. Ruyssen in Pharmaceutical Enzymes (1978), Story Scientia, Gent (Belgium), was 200 units (U) per mg of lipase. After degassing the suspenison was incubated overnight. After the incubation 105 U (10.5) lipase activity was found in the supernatant. The adsorption amounted to 90%. After separation of the supernatant on a glass suction filter the beads were contacted twice with 5 ml water for 45 minutes. The water appeared to contain 23 U lipase activity. After removal of the water by suction the beads were incubated in 10 ml 50% ethanol for 2 hours. The supernatant appeared to contain 867 U lipase activity, i.e. 87% of the original lipase activity was present in the eluate.

6. 10 g of the support material were added to a solution of 0.132 g (2.2 mmoles) of ethylene diamine in 25 ml of dimethyl formamide.

Following degassing the solution was subjected to 1 night's stirring. The suspension was filtered and washed successively with 200 ml of dimethyl formamide, 200 ml of water, 300 ml of 1 M NaCl and 300 ml of water. Upon analysis of a sample of this support material followed by drying and titration in glacial acetic acid with perchloric acid it was found that it contained 100 μmoles of primary amino groups per gramme.

5 g of the support material thus loaded with primary amino groups were suspended in 15 ml of 0.1 M NaCl and degassed. To this suspension there were added, with stirring and over a period of 30 minutes, small amounts of powdered succinic anhydride. In all, 2 g (20 mmoles) were added. During said period the suspension was kept at pH=6 by adding 20%-sodium hydroxide solution. After filtration the beads were washed successively with water, 0.1 M NaCl and water. By spot plate test it was determined whether all amino groups had been converted. In this test 1 bead of ningydride was contacted with 10 mg of the sample in 0.1 ml of water. Upon the beads turning blue the reaction with succinic anhydride was repeated until in the ninhydride test the beads no longer turned blue. In this way a weakly acid ion exchanger was obtained. The support material was also found suitable to be used as a precursor for an affinity column.

EXAMPLE XII

In this Example it is demonstrated that the hydrolytic stability of the support materials according to the invention is far better than that of exclusively silanized support material or of unsilanized support material coated with a crosslinked polymer obtained by addition polymerization and having 0.1 to 140 μmoles of vinyl monomers/m$^2$ inorganic material.

In all cases use was made of silica beads (pore diameter: 650 Å, bead diameter: 100–200μ; specific surface area: 50 m$^2$/g).

Three types of support material were prepared.

Type A was prepared in accordance with the procedure of Example I by treating the silica beads with γ-glycidoxypropyl trimethoxysilane. By elemental analysis the carbon content was found to be 1.91%. After hydrolysis of the γ-glycidoxy groups the support was formed by covalently linking a coating of a crosslinked copolymer of 308 μmoles of N-methylol acrylamide and 196 μmoles of N-hydroxysuccinimide-activated 6-acrylamide pentane carboxylic acid per gramme to the surface of the γ-glyceryipropyl siloxy silica. The carboxyl groups activated with N-hydroxysuccinimide were converted by titration with a 1 molar ethanolamine solution. By elemental analysis the resulting material was found to contain 5.68% carbon and 0.93% by weight of nitrogen.

Type B was prepared by coating unsilanized silica beads directly with a crosslinked copolymer of 360 μmoles of N-methylolacrylamide and 210 μmoles of 6-acrylamidopentane carboxylic acid/g activated with N-hydroxy-succinimide. The carboxyl groups activated with N-hydroxysuccinimide were converted by titration with an ethanolamine solution. By elemental analysis the carbon content and the nitrogen content of the material obtained were found to be 4.38 and 1.05% by weight, respectively.

Type C was prepared in accordance with the procedure used in Example I by coating the silica beads with γ-glucidoxypropyl trimethoxysilane. By elemental analysis the carbon content was found to be 3.28% by weight. This corresponds to 455 μmoles γ-glycerylpropyl siloxy groups per gramme.

The support materials (Types A, B and C) thus prepared were subjected to the following hydrolysis tests: 2 g of support material were stirred for 1 week or 1 day at a temperature of 70° C. in three different bufers having a pH of 8.8; 9.5 and 4.0, respectively. The results are summarized in the following table.

TABLE

| support material | type A C % | type A N % | type B C % | type B N % | type C C % |
|---|---|---|---|---|---|
| before hydrolysis after hydrolysis: | 5.68 | 0.93 | 4.38 | 1.05 | 3.28 |
| in 0.1 M tris buffer of pH = 8 | | | | | |
| 1 day | — | — | 4.03 | 0.96 | — |
| 1 week | 5.37 | 0.91 | 3.37 | 0.82 | 3.05* |
| in 0.2 M borate buffer of pH = 9.5 | | | | | |
| 1 week | 5.26 | 0.89 | — | — | — |
| in 0.2 M acetate buffer of pH = 4.0 | | | | | |
| 1 day | — | — | 3.89 | 0.94 | — |
| 1 week | 5.37 | 0.90 | — | — | 3.16 |

*Upon completion of the experiment the suspension was milk white, which points to the presence of silica particles as a result of hydrolytic decomposition of type C.

From the results mentioned in the above table it is evident that the type A support material (according to the invention) is very stable to hydrolysis. The type B support material was more resistant to a buffer having a high pH than to one having a low pH. The C type support material is less suitable for most uses as a result of interaction with biomacromolecules.

EXAMPLE XIII

In a similar way as described in Example I silica beads (pore diameter 500 A, specific area 63 m$^2$/g, bead diameter 100–200μ) were loaded with 210 μmoles γ-glycerylpropylsiloxy groups per gramme of beads.

To 10 g of the silanized silica there were added an aqueous solution of 1.045 g (5.06 mmol) of 3-dimethylaminopropylmethacrylamide hydrochloride, 0.91 ml (6.0 mmol) of an aqueous solution (60% by weight) of N-methylolacrylamide and 30 ml of methanol. After evaporation of methanol 45.5 mg of AIBN (azobisisobutyronitril) in 35 ml of iso-octane were added and polymerization was effected.

Elemental analysis of the polymerized product gave a carbon content of 7.64% and a nitrogen content of 1.75%. By microtitration the amount of weak basic dimethylamino groups of the ion exchanging product was determined to be 325 μmoles per g or 6.1 μmoles/m$^2$.

EXAMPLE XIV

In a similar way as described in Example I silica beads (pore diameter 500 Å, specific surface area 63 m$^2$/g, bead diameter 100–200μ) were loaded with 172 μmol γ-glycerylpropylsiloxy groups per g of beads. To 40 g of the silanized beads there were added 7.6 ml of an aqueous solution (40 wt %) of methacrylamidopropyl-trimethylammoniumchloride (18.1 mmoles), 3.64 ml of an aqueous solution (60 wt %) of N-methylolacrylamide (24 mmoles) and 140 ml of methanol. After evaporation of methanol 150 mg of AIBN dissolved in 140 ml iso-octane were added. After polymerization the beads were washed successively with acetone, methanol, water and a 3 M NaCl-solution.

Elemental analysis of the fried product gave a carbon content of 7.32% and a nitrogen content of 1.59%. By microtitration the amount of strongly basic trimethylammonium groups of the ionexchanger was determined to be 255 μmoles per g or 4.7 μmoles/m$^2$.

EXAMPLE XV (a) In a similar way as described in Example I silica beads (pore diameter 700 Å, specific surface area 42 m²/g, bead diameter 100–200μ) were loaded with 143 μmoles γ-glycerylpropylsiloxy groups per g beads.

To 50 g of the silanized beads there was added a mixture of 5.18 g (25.0 mmoles) of 2-acrylamido-2-methylpropane sulphonic acid, 3.5 ml (25.0 mmoles) of triethylamine, 4.55 ml (6.0 mmoles) of an aqueous solution (60 wt %) of N-methylolacrylamide and 150 ml of methanol. After evaporation of methanol 250 mg of AIBN, 50 mg of p-toluene-sulphonic acid and 200 ml iso-octane were added.

The product obtained after polymerization was successively washed with acetone, methanol, water and 5% hydrochloric acid.

Elemental analysis: carbon 5.99%, nitrogen 1.16%, sulfur 1.25%.

The product contained 438 μmoles N-methylolacrylamide and 390 μmoles 2-acrylamido-2-methylpropane sulphonic acid per g. By microtitration the amount of sulphonic acid groups was determined to be 285 μmoles per g.

(b) 10 ml of the support material thus produced was equilibrated in a column with 0.05 M Sörensen-buffer at pH 5.5. 30 ml of a solution of haemoglobin (containing 20 mg haemoglobin per ml) was percolated through the column. After washing the column with equilibration-buffer the haemoglobin was eluted with 0.05 M Sörensen-buffer (pH=7.5) containing nO, 0.5 M and 2.M NaCl, respectively. 104 mg heaemoglobin could be eluated in total, indicating a capacity of the coluimn of 10 mg haemoglobin per ml support material in the column.

EXAMPLE XVI

In a similar way as described in Example I silica beads (pore diameter 500 Å, specific surface area 63 m²/g, bead diameter 100–200μ) were loaded with 210 μmoles γ-glycerylpropyl siloxy groups per g beads.

To 10 g of the silanized beads there was added a mixture of 0.467 g (6.50 mmoles) of acrylic acid, 0.66 ; g (6.50 mmoles) of triethylamine, 0.91 ml (6.0 mmoles) of an aqueous solution (60 wt %) of N-methylolacrylamide and 30 ml of methanol. After evaporation of methanol 60 mg of AIBN and 20 mg p-toluene sulphonic acid in 30 ml of iso-octane were added. After polymerization the product was washed successively with acetone, methanol, 5% hydrochloric acid and water.

Elemental analysis: carbon 5.03%; nitrogen 0.67%. The product contained 480 μmoles N-methylolacrylamide and about 170 μmoles acrylic acid groups per g.

The capacity for haemoglobin, determined as in Example XVb), was 11.6 mg/ml.

EXAMPLE XVII 10 g of the beads produced in Example II were pyrolysed at 650° C. for 2 hours. After cooling white silica beads were obtained with a carbon and nitrogen content both being below 0.05%. The beads were retreated and recoated in the way as described in Examples I and II. The product obtained had a carbon content of 8.63% and a nitrogen content of 1.73%.

Comparison of the gelpermeation calibration curves, obtained by elution of polystyrene standards in tetrahydrofuran indicated that the pore diameter range of the material after recoating was the same as that of the original coated product.

EXAMPLE XVIII

The beads produced in Example VI were tested on their gelpermeation (size exlusion) properties for various proteins at pH 7 and 9 in 0.02 M phosphate-buffer containing 0.15 M NaCl.

A column (diameter 1 cm, height 34.1 cm) was filled with the beads. Injection volume: 0.1 ml containing 1 mg protein per ml. Flow was 2.5 ml per minute per cm². Results:

| protein | Molecular weight | $pK_I$ | $K_d$ pH = 7 | $K_d$ pH = 9 |
|---|---|---|---|---|
| catalase | 221600 | 5.58 | 0.18 | 0.17 |
| γ-globulin | 153000 | 7.0 | 0.15 | 0.15 |
| serum albumin | 68500 | 4.90 | 0.25 | 0.31 |
| haemoglobulin | 64450 | 6.8 | 0.41 | 0.35 |
| ovalbumin | 45000 | 4.6 | 0.36 | 0.33 |
| pepsin | 36000 | 1.0 | 0.37 | 0.49 |
| β-lactoglobulin | 35400 | 5.0 | 0.39 | 0.48 |
| trypsinogen | 23560 | 9.3 | 0.47 | 0.32 |
| myoglobin | 18500 | 7.0 | 0.46 | 0.44 |
| lysozyme | 14000 | 10.7 | 0.71 | — |
| cytochrome-C | 13000 | 10.65 | 0.49 | * |
| insulin | 5750 | 5.50 | 0.62 | 0.55 |

*elution impossible

The distribution coefficient $K_d = \dfrac{V_r - V_o}{V_t - V_o}$ $V_r$ = retention volume of the protein
$V_o$ = retention volume of a completely excluded component
$V_t$ = retention volume of a completely permeable component.

EXAMPLE XIX

The support material of Example VI 1. containing p-aminobenzamidine groups was used for trypsin and chymotrypsin isolation. A column was filled with the beads. The equilibration buffer used was 0.1 M sodium acetate (pH 5.5) containing 0.1 M NaCl and 0.001 M CaCl₂. Flow rate was 15.6 ml/hr. The column was eluted with 0.1 M glycine-HCl buffer (pH 2.0) containing 0.1 M NaCl and 0.001 M CaCl₂.

Activated pancreas powder (30 g) was extracted with equilibration buffer (100 ml) at 5° C. 60 ml of the filtrated extract was applied to the column. The column was washed with equilibration buffer and then eluted with glycine-HCl buffer.

It was found that the trypsin so obtained in the eluate was purified 7 times and the chymotrypsin about 3 times (Trypsin activity was measured using the chromogenic substrate S-2160; chymotrypsin activity was measured potentiometrically using ATEE as a substrate).

Both enzymes were found to be approximately 30% pure after a single chromatography step.

EXAMPLE XX

In a similar way as described in Example III silica beads (pore diameter 3200 Å, bead diameter 100–200μ, specific surface area 12 m² per g) were silanized with 28.8 μmoles γ-glycerylpropylsiloxy groups per g and coated with a copolymer of N-methylolacrylamide (150 μmoles) and N-hydroxysuccinimidyl acrylic acid ester (91 μmoles/g). The beads (10 g) were then treated with a solution of 1790 μmoles γ-glutamylcysteinylglycin (glutathione) in 30 ml bicarbonate buffer 0.1 M, pH 8.5, for 22 hours.

The beads were washed successively with 200 ml 0.1 M NaHCO₃-buffer (pH 8.5), 100 ml 0.1 M NaHCO₃- buffer (pH 9.5) containing 1 M NaCl and 0.001 M EDTA, 100 ml 0.1 M NaHCO$_3$-buffer (pH 4.3) containing 1 M NaCl and 0.001 M EDTA, and finally with 100 ml 0.001 M EDTA.

The sulfhydryl groups were activated with 2,2'-dipyridyldisulfide in TRIS-HCl buffer 0.1 M, pH 8, containing 0.3 M NaCl and 0.001 M EDTA.

The resulting material contained 10 μmoles activated sulfide groups per g (determined spectrofotometrically at 343 nm after reaction with β-mercapto-ethanol).

The material so produced was suited for the isolation of proteins containing thiol groups, e.g. enzymes such as urease.

With this material also enzymes, such as urease, can be immobilized without loss of their activity. The column loaded with urease can advantageously be used for determining the ureum content of aqueous solutions, e.g. urine, by percolating the ureum solution through the column and determining NH$_3$ in the eluate with a NH$_3$-electrode.

I claim:

1. A support material, usable as such in chromatography or as a starting material which, upon linkage to it of compounds containing ionic groups, ligands or biomacromolecules, can be used as ion exchanger, as a medium in affinity chromatography or in enzymatic reactions, consisting of porous, inorganic silanized particles onto which there is covalently bonded an organic, stationary phase built up of (co)polymerized vinyl monomers and containing amide groups, characterized in that
   (a) a hydroxyl-containing inorganic material has been silanized with an organo silane of the formula I

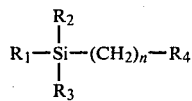

wherein n=1–5; R$_1$ is halogen or alkoxy (1–10 C); R$_2$ and R$_3$ are each halogen, alkoxy (1–10 C), alkyl (1–3 C) or aryl (6–10 C), the halogen and alkoxy group in R$_1$, R$_2$ and R$_3$ being capable of forming an —O—Si-bond between the silane and the inorganic material through its surface hydroxyl groups; and R$_4$ is amino, substituted amino, mercapto, an ester group or glycidoxy; and (B) the organic stationary phase is a crosslinked (co)-polymer obtained by addition polymerization and built up of 0.1 to 140 μmoles of vinyl monomers per m$^2$ inorganic surface of the support material, said (co)polymer containing at least 0.1 μmoles amide groups per m$^2$ inorganic surface of the support material, and said vinyl monomers consisting wholly or partly of bifunctional vinyl monomers containing amide groups and having the formula II

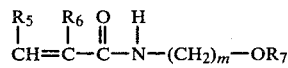

wherein R$_5$ and R$_6$ each are hydrogen or an organic group having up to 18 carbon atoms; R$_7$ is hydrogen or an organic group up to 20 carbon atoms; and m is an integer from 1 to 20.

2. A support material according to claim 1, characterized in that R$_5$ and R$_6$ each are hydrogen, an alkyl or cyclo-alkyl group up to 6 carbon atoms or an aryl group up to 10 carbon atoms; and m is an integer from 1 to 10.

3. A support material according to claim 2, characterized in that R$_5$ is hydrogen; R$_6$ is hydrogen or methyl; R$_7$ is hydrogen; and m=1.

4. A support material according to any one of claims 1, 2 or 3, characterized in that said vinyl monomers consist of at least 5 mol% of bifunctional vinyl monomers of formula II.

5. A support material according to claim 4, characterized in that the amide groups have been obtained partly by bringing into reaction
   (a) a spacer molecule, a ligand, a biomacromolecule, or a compound containing an ionic group, each having a reactive group and one or more amide groups, with a reactive group of a vinyl monomer or the crosslinked (co)polymer; or
   (b) a spacer molecule, a ligand, a biomacromolecule or a compound containing an ionic group, each having one or more amino and/or carboxyl groups, with one or more carboxyl and/or amino groups in the crosslinked (co)polymer.

6. A support material according to claim 5 characterized in that the (co)polymer contains 5 to 25 μmoles of amide groups per m$^2$ inorganic surface of the support material.

7. A support material according to claim 6, characterized in that the comonomer for obtaining the crosslinked copolymer is chosen from one or more vinyl monomers having a functional group and having the formula III

wherein
R$_8$ is H or CH$_3$; R$_9$ is —CH$_2$NH$_2$,

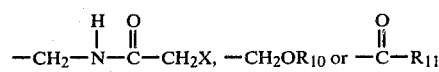

X is halogen; R$_{10}$ = alkyl up to 10 carbon atoms, or glycidoxy;
R$_{11}$ represents a functional group, which is linked to the carbonyl group and has the meaning of a hydroxyl group or one of the following groups

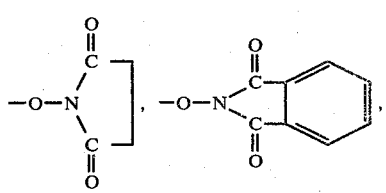

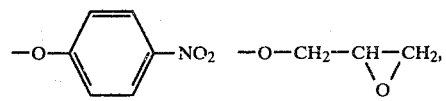

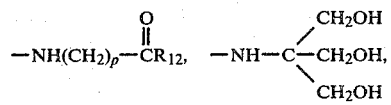

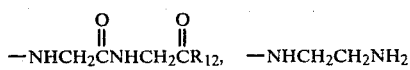

-continued

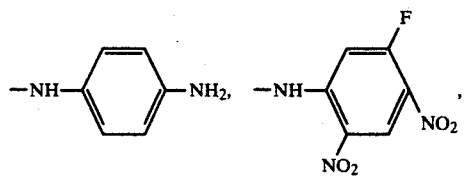

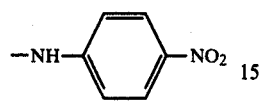

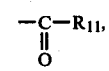

wherein
$R_{12}$ has the same meaning as $R_{11}$ and p represents an integer from 1 to 10, and the molecular weight of the vinyl comonomer having a functional group is not higher than 1000.

8. A support material according to claim 7 wherein, in formula III, $R_9$ is

9. A support material according to claim 7 wherein, in formula III, when $R_9$ is $$-CH_2-\overset{H}{\underset{|}{N}}-\overset{O}{\underset{\|}{C}}-CH_2X,$$

X is Br.

10. A support material according to claim 7 wherein, in formula III, when $R_9$ is $-CH_2OR_{10}$, $R_{10}$ is methyl.

11. A support material according to claim 7 wherein the vinyl comonomer having a functional group has a molecular weight in the range of 70 to 400.

12. A support material according to claim 7 wherein, in formula III, when $R_9$ is $$-\overset{}{\underset{\|}{C}}-R_{11},$$
$$\phantom{-}O$$

$R_{11}$ is linked to the carbonyl group via a spacer group, and the molecular weight of the vinyl comonomer having a functional group is not higher than 1000.

13. A support material according to claim 12 wherein the vinyl comonomer having a functional group has a molecular weight in the range of 70 to 400.

14. A support material according to claim 1 wherein, in formula I, n=3.

15. A support material according to claim 1, wherein, in formula I, $R_4$ is glycidoxy.

16. A support material according to claim 1, wherein in (B) the copolymer is built up of 5 to 25 μmoles of vinyl monomers per $m^2$ inorganic surface of support material.

17. A support material according to claim 1 wherein in the organo silane of formula I, $R_4$ is a ω-amino-alkyl (1-3C) - amino.

* * * * *